(12) United States Patent
Wisnewski et al.

(10) Patent No.: US 8,600,345 B2
(45) Date of Patent: *Dec. 3, 2013

(54) VEHICLE DATA MANAGEMENT SYSTEM AND METHOD

(75) Inventors: Mark A. Wisnewski, Stockbridge, MI (US); Kenneth L. Peirce, Grosse Pointe Farms, MI (US); David J. Trzcinski, Howell, MI (US); Charles A. Massoll, Milford, MI (US); David R. Petrucci, Warren, MI (US); Thiep T. Nguyen, Macomb, MI (US); Nathan C. Callaghan, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,538

(22) Filed: Aug. 7, 2012

(65) Prior Publication Data

US 2012/0302202 A1 Nov. 29, 2012

Related U.S. Application Data

(63) Continuation of application No. 12/906,741, filed on Oct. 18, 2010, now Pat. No. 8,238,872.

(51) Int. Cl.
*H04M 11/00* (2006.01)
(52) U.S. Cl.
USPC .......................................... 455/405

(58) Field of Classification Search
USPC ......... 370/310.2, 315, 328, 395.21, 252, 338; 455/11.1, 41.2, 405–408, 414.1, 418, 455/425, 557, 569.2, 404.1, 404.2, 419; 340/522, 539.11
See application file for complete search history.

(56) References Cited

U.S. PATENT DOCUMENTS

| 2007/0140187 | A1  | 6/2007  | Rokusek et al. |
| 2010/0210302 | A1  | 8/2010  | Santori et al. |
| 2011/0055413 | A1* | 3/2011  | Lobsenz ....................... 709/231 |
| 2011/0080282 | A1* | 4/2011  | Kleve et al. .............. 340/539.11 |
| 2011/0167460 | A1* | 7/2011  | Tranchina ....................... 725/75 |
| 2011/0276442 | A1* | 11/2011 | Momtahan et al. ............. 705/30 |
| 2012/0028603 | A1* | 2/2012  | Gorman et al. ............... 455/408 |
| 2012/0094630 | A1  | 4/2012  | Wisnewski et al. |

* cited by examiner

*Primary Examiner* — Wesley Kim
*Assistant Examiner* — Dinh P Nguyen

(57) ABSTRACT

A system and method of for establishing a connection between a vehicle and an external network includes a plurality of personal electronic devices and a transceiver. The plurality of personal electronic devices are each configured for establishing a data connection to the vehicle. Each of the plurality of personal electronic have a mobile plan that includes a data limit and an amount of data used. At least one of the plurality of personal electronic devices are selected to be in communication with the external network. Selection of at least one of the plurality of personal electronic devices is based on a corresponding amount of data available in a mobile plan for each of the personal electronic devices.

14 Claims, 2 Drawing Sheets

VEHICLE DATA MANAGEMENT SYSTEM AND METHOD

CROSS-REFERENCE TO RELATED APPLICATION

Figure 1:
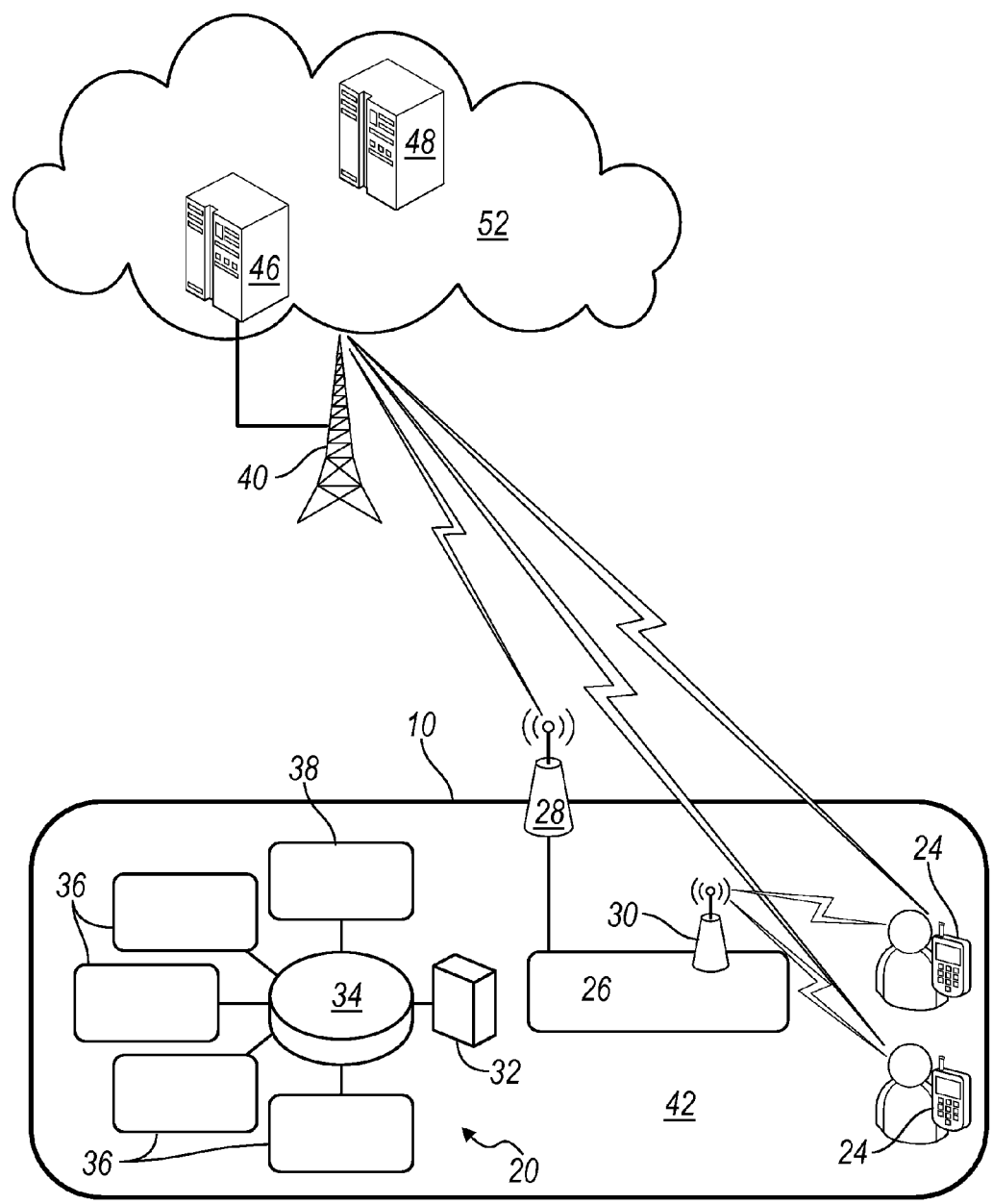

This application is a continuation of U.S. patent application Ser. No. 12/906,741 filed on Oct. 18, 2010. The disclosure of the above application is incorporated herein by reference.

FIELD

The present invention relates to a communication system and method, and in particular to a communication system and method for establishing a connection between a vehicle and an external network.

BACKGROUND

The statements in this section merely provide background information related to the present disclosure and may or may not constitute prior art.

In some circumstances, personal electronic devices may have faster and less expensive advances in wireless communications technology when compared to electronic devices used in the automotive industry. A personal electronic device such as, for example, a smartphone may have the capability to send and receive data over a much faster wireless network when compared to an electronic device in an automobile. For example, the vehicle may only have the capability for wireless communications using a short messaging service (SMS) network, or a first or second generation wireless network (1G or 2G). In contrast, some types of smartphones have the capability to utilize a much faster third generation cellular wireless network (3G) or fourth generation of cellular wireless network (4G network). Moreover, mobile device data plans also tend to be less expensive than data plans for electronic devices in automobiles. In fact, some mobile device data plans even have an unlimited data quota.

The wireless network associated with a personal electronic device is generally available in most areas. Therefore, vehicle occupants often carry their personal electronic devices while traveling in a vehicle. Accordingly, there is a need in the art for a system that will utilize the faster, less expensive personal electronic device wireless network to connect with the vehicle's electronic devices.

SUMMARY

A method and system for establishing a connection between a vehicle and an external network is disclosed. The method includes a first step where a data connection is established between a plurality of personal electronic devices and the vehicle. The personal electronic devices each have a mobile plan. The mobile plan includes a data limit and an amount of data used. The plurality of personal electronic devices are each in communication with the external network. In a second step, the mobile plan of each of the plurality of personal electronic devices is monitored. In a third step, an amount of data available for the mobile plan is determined for each of the plurality of personal electronic devices. The amount of data available is the difference between the data limit and the amount of data used. In a fourth step, at least one of the plurality of personal electronic devices are selected based on the amount of data available. In a fifth step, a data connection is established between the external network and the selected one of the plurality of personal electronic devices.

In yet another embodiment of the present invention, the step of establishing the data connection between the external network and the selected one of the plurality of personal electronic devices further comprises establishing a first set of RF signals associated with the external network. The first set of RF signals are in a form compatible with a mobile communication network.

In still another embodiment of the present invention, the method further comprises converting the first set of RF signals into a second set of RF signals by the selected one of the plurality of personal electronic devices. The second set of RF signals are in a form compatible for short-range wireless communication.

In yet another embodiment of the present invention, the method further comprises communicating the second set of RF signals from the selected one of the plurality of personal electronic devices to a transceiver. The transceiver is connected to the vehicle and is in bi-directional communication with the personal electronic device.

In still another embodiment of the present invention, the method further comprises communicating the second set of RF signals from the transceiver to a control module through a communication bus. The bus is connected to the vehicle and is in bi-directional communication with the transceiver. The control module is connected to the vehicle and is in bi-directional communication with the bus.

In yet another embodiment of the present invention, the method further comprises executing control logic by the control module to monitor and select at least one of the plurality of personal electronic devices to be in communication with the external RF device.

In still another embodiment of the present invention, the method further comprises communicating data between the external network and a host server. A cellular network supplies information between the host server and the external network. The host server monitors and selects the at least one of the plurality of personal electronic devices.

In yet another embodiment of the present invention, the method further comprises executing a security software application. The security software application provides a secure connection between the external network and each of the plurality of personal electronic devices.

In still another embodiment of the present invention, the method further comprises executing a rewards software application. The rewards software application includes a metric for determining rewards points in the application. The rewards points correspond to the amount of data that is downloaded by the personal electronic device from the external network, and where the rewards points correspond to a monetary credit that is used towards the purchase of goods and services.

A communication system for establishing a connection between a vehicle to an external network is also disclosed. The communication system includes a plurality of personal electronic devices, a transceiver and a control module. A data connection is established between the plurality of personal electronic devices and the vehicle. The plurality of personal electronic devices each have a mobile plan having a data limit and an amount of data used. The plurality of personal electronic devices are each communicatable with the external network. The transceiver is connected to the vehicle. The transceiver is in bi-directional communication with the external network through the selected one of the plurality of personal electronic devices. The control module is connected to the vehicle, and is in bi-directional communication with the transceiver. The control module includes a first control logic for monitoring the mobile plan of each of the plurality of personal electronic devices. The control module further includes a second control logic for determining an amount of data available for the mobile plan for each of the plurality of personal electronic devices. The amount of data available is the difference between the data limit and the amount of data used. The control module further includes a third control logic for selecting at least one of the plurality of personal electronic devices based on the amount of data available. The control module also includes a fourth control logic for establishing a data connection between the external network and the selected one of the plurality of personal electronic devices to connect the vehicle with the external network.

Further areas of applicability will become apparent from the description provided herein. It should be understood that the description and specific examples are intended for purposes of illustration only and are not intended to limit the scope of the present disclosure.

DRAWINGS

The figures described herein are for illustration purposes only and is not intended to limit the scope of the present disclosure in any way.

Figure 2:
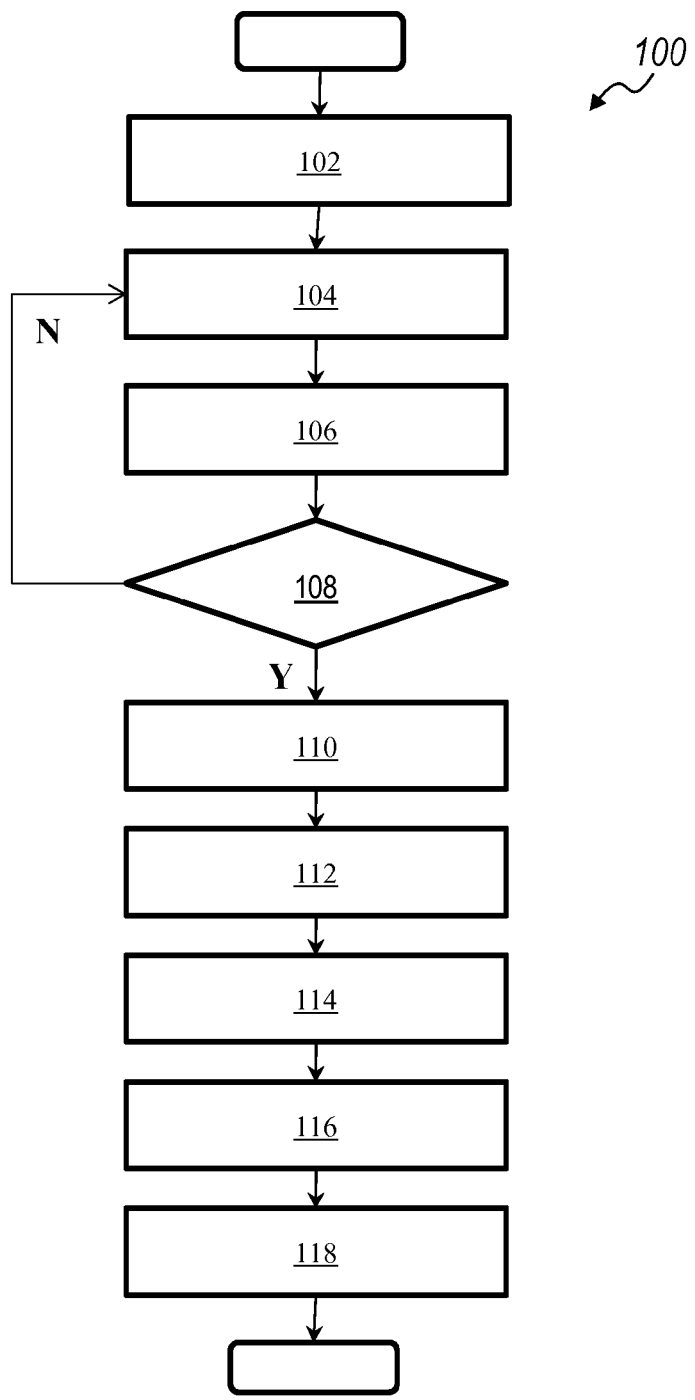

FIG. 1 is a schematic illustration of an exemplary RF signal communication system in a vehicle; and FIG. 2 is a process flow diagram of a method of selecting a personal electronic device to communicate RF signals to a vehicle.

DETAILED DESCRIPTION

The following description is merely exemplary in nature and is not intended to limit the present disclosure, application, or uses.

With reference to FIG. 1, a schematic view of a vehicle is generally indicated by reference number 10, where an exemplary RF signal communication system 20 for receiving radio frequency (RF) signals is connected to the vehicle 10. The communication system 20 includes a plurality of personal electronic devices 24, a transceiver 26, an exterior vehicle antenna 28, an interior vehicle antenna 30, a firewall 32, a communication bus 34, at least one control module 36, and an in-vehicle display 38. The transceiver 26, the vehicle antennas 28 and 30, the firewall 32, the communication bus 34, the control module 36, and the in-vehicle display 38 are each integrated or connected with the vehicle 10. The personal electronic devices 24 are separate from the vehicle 10, and are any type of portable electronic device capable of sending and receiving RF signals such as, for example, a laptop computer having an Internet connection, a smartphone, or a personal navigation device (PND).

In the embodiment as illustrated, the portable electronic devices 24 are smartphones that send and receive RF signals in a form compatible with a mobile communications network. Specifically, the personal electronic devices 24 are each configured to send and receive mobile communication signals to and from an external RF device 40 located in an exterior environment. In one example, the mobile communication frequency signals allow for simultaneous use of speech and data services. The mobile communication signals could comply with fourth generation wireless standards (4G network). However it is understood that other types of mobile communication frequency signals could be used as well such as, for example, third generation mobile communication wireless standards.

The external RF device 40 is any type of structure capable of transmitting and receiving RF signals that is located in the environment outside of an interior cabin 42 of the vehicle 10, and represents an external network. In the example as illustrated the external RF device is a cellular telephone tower. However, it is understood that other types of structures for transmitting and receiving RF signals could be used as well such as, for example, a GPS satellite. The external RF device 40 is in communication with a cellular network 46 as well as a host server 48. A communication cloud 52, which could be the Internet, is a type of communication path or network between the cellular network 46 and the host server 48. The host server 48 is the content provider, and the cellular network 46 acts as a pipeline to supply information from the host server 48 to the external RF device 40. The external RF device 40 then communicates information provided by the host server 48 to at least one of the personal electronic devices 24.

In the embodiment as illustrated, at least one of the personal electronic devices 24 are selected to be in communication with the external RF device 40 in order to transmit and receive mobile communication signals to and from the external RF device 40. Specifically, the personal electronic devices 24 are each monitored to determine a corresponding amount of data that is available or remaining in a personal mobile data plan purchased by a consumer, and the personal electronic device 24 with the greatest amount of data available is selected. A personal mobile data plan is typically a data plan provided by a wireless communication service provider, and allows a consumer to access the Internet or other types of web browsing services. One example of a personal mobile data plan would be a data plan offered through a cellular service provider that allows for a mobile customer to browse the Internet over a smartphone.

The personal mobile plan includes a data limit or data cap as well as an amount of data used. The data limit is the total amount of data that is available during a billing cycle of the personal mobile plan. For example, the data limit could be the amount of data in a personal mobile plan that a consumer is allotted before incurring extra charges or penalties. The amount of data used is typically the amount of data that has already been used by a consumer during a billing cycle of the personal mobile plan. The amount of available data is the difference between the data limit and the amount of data that has been used in the personal mobile plan. After determining which personal electronic device 24 has the greatest amount of available data in the corresponding personal mobile plan, the personal electronic device 24 with the greatest amount of available data is then selected to be in communication with the external RF device 40.

The monitoring, determination of available data, and selection of the personal electronic device 24 can be performed by one of the control modules 36 of the vehicle 10, or, alternatively, by the host server 48. In one embodiment, at least one of the control modules 36 include control logic for monitoring the amount of data remaining in each personal mobile data plan, determining which personal electronic device 24 has the greatest amount of available data, and for selecting at least one of the personal electronic devices 24. In an alternative embodiment, the host server 48 is programmed to select the personal mobile device 24 based on the amount of data remaining in each personal mobile device plan.

Selection of the personal electronic device 24 can be determined by a variety of different approaches. In one approach, the selected personal electronic device 24 has the greatest amount of remaining data in the corresponding personal mobile device plan when compared to the remaining personal electronic devices 24. For example, two personal electronic devices 24 are available for mobile communication with the external RF device. If one of the personal electronic devices 24 has an unlimited data plan while the other personal electronic device 24 is near or at the data limit of the corresponding data plan, then the personal electronic device 24 with the unlimited data plan would be selected to be in communication with the external RF device 40. In another approach, if both of the personal electronic devices 24 have about the same amount of remaining data in the corresponding data plan (i.e., if both data plans have approximately two-hundred and fifty megabytes of data remaining), then both of the personal electronic devices 24 can be used simultaneously to transmit and receive mobile communication signals to and from the external RF device 40.

Each of the personal electronic devices 24 include circuitry for converting the RF signals received from the external RF device 40 into a form compatible with a short-range wireless network. That is, the personal electronic devices 24 each have circuitry to convert RF signals compatible with a mobile communication network into RF signals compatible with a short-range wireless network. The RF signals compatible with a short-range wireless network can be any type of wireless signal intended for short-range usage such as, for example, a Bluetooth® wireless communication standard based on the IEEE Standard 802.15, or a Wi-Fi® wireless communication standard based on the IEEE Standard 802.11.

In one embodiment, a mobile software application is available on each of the personal electronic devices 24. The software application could be downloaded by the consumer from the Internet or pre-installed on the personal electronic device 24 during manufacture. The software application can be used to provide a data security system for the short-range wireless network. For example, in one embodiment, the short-range wireless network is a Bluetooth® wireless communication network, and the software application encrypts data sent over the short-range wireless network. In addition to providing a secure connection, the software application may also include a metric for determining rewards points that can be redeemed by a consumer. Specifically, the rewards points correspond to a fixed amount of data that is downloaded by the personal electronic device 24 and is communicated over the short-range wireless network. For example, in one embodiment a single rewards point could represent a megabyte of data downloaded by the personal electronic device 24. The rewards points could be redeemed by the consumer in exchange for goods or services. In one embodiment, the rewards points could be redeemed for a free automotive oil change at a dealership, free or reduced price movie tickets, or a discount on a new automobile. It should be noted that the rewards points could be redeemed for a variety of goods and services.

In addition to being in bi-directional communication with the external RF device 40, each of the selected personal electronic devices 24 are also in bi-directional communication with the interior antenna 30 located within the interior cabin 42 of the vehicle 10. The interior antenna 30 is connected to the transceiver 26. The transceiver 26 is any device capable of sending and receiving RF signals. The transceiver 26 also includes circuitry for demodulating RF signals into non-modulated signals as well as circuitry for modulating non-modulated signals into RF signals. The interior antenna 30 allows for the transceiver 26 to transmit and receive RF signals to and from the personal electronic device 24. Specifically, the interior antenna 30 is sized to transmit and receive short-range wireless network signals that are emitted from the selected personal electronic devices 24. The transceiver 26 receives the short-range wireless signals from the interior antenna 30 and demodulates the short-range wireless communication signals into non-modulated signals. Thus, the transceiver 26 of the vehicle 10 can receive data sent by external RF device 40 through the selected personal electronic devices 24.

The exterior vehicle antenna 28 is connected to an exterior surface 60 of the vehicle 10. The exterior vehicle antenna 28 can be used to transmit and receive mobile communication signals to and from the external RF device 40. The exterior vehicle antenna 28 could also be used for receiving other types of RF transmissions that are not transmitted through the external RF device 40 such as, for example, FM or AM transmissions. Although FIG. 1 illustrates separate interior and exterior antennas 28 and 30, it is understood that the exterior antenna 28 could be omitted in an alternative embodiment.

The transceiver 26 is in bi-directional communication to transmit and receive non-modulated signals from the bus 34. In the example as illustrated, the firewall 32 is coupled to the bus 34 in an effort to prevent authorized intrusion from other entities into the control modules 36. The bus 34 is a communications network used to transfer data between each of the various control modules 36 as well as the transceiver 26. In one embodiment, a controller area network (CAN) bus standard is used to allow the control modules 36 to communicate with each other, however it is understood that other types of bus standards may be used as well.

FIG. 1 illustrates several control modules 36 that are in communication with the bus 34 to send and receive non-modulated signals from the transceiver 26. The control modules 36 are preferably an electronic control device having a preprogrammed digital computer or processor, control logic, memory used to store data, and at least one I/O peripheral. The control logic includes a plurality of logic routines for monitoring, manipulating, and generating data. For example, the control module 36 could be an infotainment module, or a telematics module.

At least one of the control modules 36 may also be in communication with the display 38 through the bus 34. In the embodiment as illustrated, the display 38 is a screen such as, for example, a liquid crystal display (LCD) that electronically displays graphics like text, images, and moving pictures. The display 38 is located in an area that can be viewed by a driver such as, for example, in the center console (not shown) located within the interior cabin 42 of the vehicle 10. The display 38 is used to show the images that are generated by one or more of the control modules 36. In one exemplary embodiment, a consumer could download an Internet webpage using their personal electronic device 24, and view the corresponding webpage on the display 38. In an alternative embodiment, a consumer could also view a televised broadcast such as Internet Protocol television (IP-TV) on the display 38 using their personal electronic device 24.

With continued reference to FIG. 1, a method 100 for communicating RF signals from the external RF device 40 to the vehicle 10 is discussed in FIG. 2. The method 100 begins at a first step 102 where a data connection between a plurality of personal electronic devices 24 and an external network is established. In one embodiment, the external network includes an external RF device 40. Each of the personal electronic devices 24 have a mobile plan. The mobile plan includes a data limit and an amount of data used. Method 100 may then proceed to step 104.

In step 104, the plurality of personal electronic devices 24 are each monitored. The monitoring of the personal electronic device 24 can be performed by one of the control modules 36 of the vehicle 10, or, alternatively, by the host server 48. Method 100 may then proceed to the step 104.

In step 106, an amount of data available for each of the personal mobile devices 24 is determined. The amount of available data is the difference between the data limit and the amount of data used. The method may then proceed to step 108.

In step 108, it is determined if at least one of the personal electronic devices 24 has data available. If at least one of the personal electronic devices 24 has available data, then method 100 may proceed to step 110. If none of the personal electronic devices 24 have data available, then method 100 returns to step 104, where the plurality of personal electronic devices 24 continue to be monitored. Alternatively, method 100 may terminate.

In step 110, at least one of the personal electronic devices 24 are selected to send and receive RF signals compatible with a mobile communication network to and from the external RF device 40. In one embodiment, selection of the personal electronic device 24 is based on a corresponding amount of data available in a personal mobile plan for each of the personal electronic devices 24. The method 100 then proceeds to step 112.

In step 112, the data connection between the vehicle 10 and the external network is established through the selected personal electronic device 24. Specifically, the selected personal electronic device 24 allows for data to be transferred from the external RF device 40 to the control module 36 of the vehicle 10. The method 100 may then proceed to step 114.

In step 114, the mobile communication signals received from the external RF device 40 are converted into a short-range wireless communication signals. Specifically, the personal electronic devices 24 each include circuitry for converting the mobile communication signals into short range-wireless communication signals. In one example, the short-range wireless signals could be either a Bluetooth® wireless communication standard based on the IEEE Standard 802.15, or a Wi-Fi® wireless communication standard based on the IEEE Standard 802.11. The method 100 then proceeds to step 116.

In step 116, the short-range wireless communication signals are communicated from the selected personal electronic device 24 to the transceiver 26. The transceiver 26 is connected to the vehicle 10, and is any device capable of sending and receiving RF signals. The method then proceeds to step 118.

In step 118, non-modulated signals are transmitted from the transceiver 26 to the control modules 36 through the bus 34. The bus 34 is used to transfer data between each of the various control modules 36 as well as the transceiver 26. In one embodiment, several control modules 36 are in communication with the bus 34 to send and receive non-modulated signals from the transceiver 26. Method 100 may then terminate, or resume at step 102.

Employing the RF signal communication system 20 will increase the number of data pipes in communication with the vehicle 10 as well as reduce the cost of wireless data transfer to the vehicle 10. This is because mobile devices tend to have faster and less expensive changes in wireless communications technology when compared to electronic devices used in the automotive industry. Therefore, employing a personal electronic device to communicate wireless data to the vehicle 10 will result in a faster, less expensive wireless connection. For example, the vehicle may only have the capability for wireless communications using a SMS network or first or second generation wireless network (1G or 2G), while a smartphone may have the capability to utilize a much faster 3G or 4G network. Moreover, the RF signal communication system 20 will also allow for the vehicle's mobile communication wireless system to be used other higher priority tasks. For example, Internet browsing could be available in the vehicle 10 through the personal mobile device 24, while the vehicle's mobile communication wireless system could be used to dispatch emergency services.

The description of the invention is merely exemplary in nature and variations that do not depart from the gist of the invention are intended to be within the scope of the invention. Such variations are not to be regarded as a departure from the spirit and scope of the invention.

What is claimed is:

1. A method for establishing a connection between a vehicle and an external network, the method comprising:
    establishing a data connection between a plurality of personal electronic devices and the vehicle, wherein the plurality of personal electronic devices each have a mobile plan having a data limit and an amount of data used, and wherein the plurality of personal electronic devices are each communicatable with the external network;
    monitoring the mobile plan of each of the plurality of personal electronic devices;
    selecting at least one of the plurality of personal electronic devices; and
    establishing a data connection between the external network and the selected one of the plurality of personal electronic devices to connect the vehicle with the external network; and
    determining an amount of data available for the mobile plan for each of the plurality of personal electronic devices, wherein the amount of data available is the difference between the data limit and the amount of data used prior to selecting the at least one of the plurality of personal electronic devices based on the amount of data available.

2. The method of claim 1 wherein establishing the data connection between the external network and the selected one of the plurality of personal electronic devices further comprises establishing a first set of RF signals associated with the external network, wherein the first set of RF signals are in a form compatible with a mobile communication network.

3. The method of claim 2 further comprising converting the first set of RF signals into a second set of RF signals by the selected one of the plurality of personal electronic devices, wherein the second set of RF signals are in a form compatible for short-range wireless communication.

4. The method of claim 3 further comprising communicating the second set of RF signals from the selected one of the plurality of personal electronic devices to a transceiver, wherein the transceiver is connected to the vehicle and is in bi-directional communication with the personal electronic device.

5. The method of claim 4 further comprising communicating the second set of RF signals from the transceiver to a control module through a communication bus, wherein the bus is connected to the vehicle and is in bi-directional communication with the transceiver, and wherein the control module is connected to the vehicle and is in bi-directional communication with the bus.

6. The method of claim 5 further comprising executing a control logic by the control module to monitor and select at least one of the plurality of personal electronic devices to be in communication with the external RF device.

7. The method of claim 6 further comprising communicating data between the external network a host server, wherein a cellular network supplies information between the host server and the external network, and wherein the host server monitors and selects the at least one of the plurality of personal electronic devices.

8. The method of claim 1 further comprising executing a security software application, wherein the security software application provides a secure connection between the external network and each of the plurality of personal electronic devices.

9. The method of claim 1 further comprising executing a rewards software application, wherein the rewards software application includes a metric for determining rewards points in the application, wherein the rewards points correspond to the amount of data that is downloaded by the personal electronic device from the external network, and wherein the rewards points correspond to a monetary credit that is used towards the purchase of goods and services.

10. A method for establishing a connection between a vehicle and an external network, the method comprising:
    establishing a data connection between a plurality of personal electronic devices and the vehicle, wherein the plurality of personal electronic devices each have a mobile plan having a data limit and an amount of data used, and wherein the plurality of personal electronic devices are each communicatable with the external network;
    monitoring the mobile plan of each of the plurality of personal electronic devices, wherein a first set of RF signals associated with the external network, wherein the first set of RF signals are in a form compatible with a mobile communication network;
    selecting at least one of the plurality of personal electronic devices; and
    establishing a data connection between the external network and the selected one of the plurality of personal electronic devices to connect the vehicle with the external network, wherein a first set of RF signals are associated with the external network, wherein the first set of RF signals are in a form compatible with a mobile communication network; and
    converting the first set of RF signals into a second set of RF signals by the selected one of the plurality of personal electronic devices, wherein the second set of RF signals are in a form compatible for short-range wireless communication; and
    determining an amount of data available for the mobile plan for each of the plurality of personal electronic devices, wherein the amount of data available is the difference between the data limit and the amount of data used prior to selecting the at least one of the plurality of personal electronic devices based on the amount of data available.

11. The method of claim 10 further comprising communicating the second set of RF signals from the selected one of the plurality of personal electronic devices to a transceiver, wherein the transceiver is connected to the vehicle and is in bi-directional communication with the personal electronic device.

12. The method of claim 11 further comprising communicating the second set of RF signals from the transceiver to a control module through a communication bus, wherein the bus is connected to the vehicle and is in bi-directional communication with the transceiver, and wherein the control module is connected to the vehicle and is in bi-directional communication with the bus.

13. The method of claim 12 further comprising executing a control logic by the control module to monitor and select at least one of the plurality of personal electronic devices to be in communication with the external RF device.

14. The method of claim 10 further comprising communicating data between the external network and a host server, wherein a cellular network supplies information between the host server and the external network, and wherein the host server monitors and selects the at least one of the plurality of personal electronic devices.

* * * * *